US010206383B2

(12) United States Patent
Bain

(10) Patent No.: US 10,206,383 B2
(45) Date of Patent: Feb. 19, 2019

(54) LINE TIER

(71) Applicant: Hook-Eze Pty Limited, Tivoli (AU)

(72) Inventor: Ross Bain, Tivoli (AU)

(73) Assignee: Hook-Eze Pty Limited, Tivoli (AU)

( * ) Notice: Subject to any disclaimer, the term of this patent is extended or adjusted under 35 U.S.C. 154(b) by 74 days.

(21) Appl. No.: 15/603,120

(22) Filed: May 23, 2017

(65) Prior Publication Data

US 2017/0332615 A1  Nov. 23, 2017

(30) Foreign Application Priority Data

May 23, 2016 (AU) .................................. 2016901939

(51) Int. Cl.
*A01K 91/04* (2006.01)
*A01K 99/00* (2006.01)
*A01K 97/06* (2006.01)

(52) U.S. Cl.
CPC .............. *A01K 91/04* (2013.01); *A01K 97/06* (2013.01); *A01K 99/00* (2013.01)

(58) Field of Classification Search
CPC ........ A01K 91/00; A01K 91/03; A01K 91/04; A01K 91/12; A01K 91/14; A01K 91/16; A01K 97/26; A01K 97/28; A01K 83/00; A01K 99/00; A01K 85/00; A01K 97/06; B65H 69/00; B65H 69/04; B65H 69/06
USPC .......................................... D22/133, 143, 149
See application file for complete search history.

(56) References Cited

U.S. PATENT DOCUMENTS

| 3,700,272 | A | * | 10/1972 | Bauer | ..................... | A01K 91/04 289/17 |
| 3,965,605 | A |  | 6/1976 | Allen | | |
| 4,081,923 | A | * | 4/1978 | Pruncutz | ................ | A01K 91/04 43/25.2 |
| 4,403,797 | A | * | 9/1983 | Ragland, Jr. | ........... | A01K 91/04 289/17 |
| 4,414,771 | A | * | 11/1983 | Martin | ..................... | A01K 97/06 221/279 |
| 4,573,719 | A | * | 3/1986 | Aldridge | ................ | A01K 91/04 223/99 |
| 4,613,173 | A |  | 9/1986 | Rosser | | |
| 4,660,314 | A |  | 4/1987 | Janssen | | |
| 5,383,695 | A |  | 1/1995 | Couper | | |

(Continued)

FOREIGN PATENT DOCUMENTS

WO         0235926 A1    5/2002
WO     WO 0235926 A1 *  5/2002

*Primary Examiner* — Ismael Izaguirre
(74) *Attorney, Agent, or Firm* — James L. Young; Westman, Champlin & Koehler, P.A.

(57) ABSTRACT

A line tier for a fishing tackle item that makes line tying easier and safer has an enclosure with a tackle retention end and a second end, a rotatable member extending from the second end permitting rotation of the enclosure about the rotatable member. The enclosure is openable so that in the open configuration a tackle item can be inserted such that a portion of the tackle item protrudes from the enclosure. In the closed configuration, the tackle item is held securely with a portion of the tackle item protruding from an elongated slot formed in the tackle retention end of the enclosure. A plurality of fishing lines can be held securely in the enclosure with a portion of each fishing line protruding from the enclosure on the tackle retention end and the second end of the enclosure.

20 Claims, 17 Drawing Sheets

(56) References Cited

U.S. PATENT DOCUMENTS

| | | | |
|---|---|---|---|
| 6,474,013 B2 | 11/2002 | Terry | |
| 6,857,219 B2 * | 2/2005 | Jang | A01K 97/06 43/25.2 |
| 7,793,458 B2 | 9/2010 | Eisbrenner | |
| 7,793,459 B1 | 9/2010 | Ruzicka | |
| 9,185,894 B1 * | 11/2015 | Almubaelesh | A01K 97/26 |

* cited by examiner

FIG. 7A
Step 1
FIG. 7B
Step 2
FIG. 7C
Step 3
FIG. 7D
Step 4
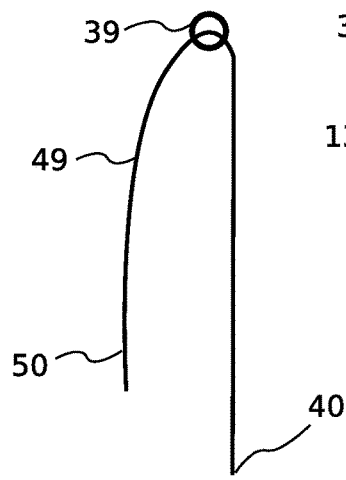
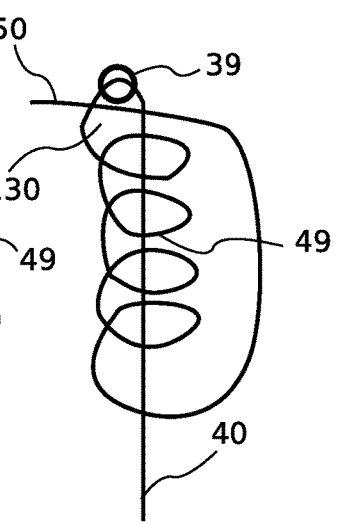
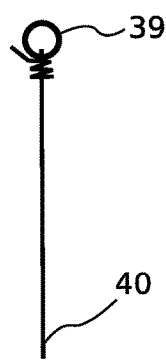

Step 1

Step 2

Step 3

Step 4

Step 5

LINE TIER

CROSS-REFERENCE TO RELATED APPLICATIONS

This Application claims priority to and the benefit of Australian Patent Application No. 2016901939, filed May 23, 2016, the content of which is incorporated herein by reference in its entirety.

FIELD OF THE INVENTION

This invention relates to the field of angling, and in particular, relates to devices and methods for tying fishing line to fishing tackle.

BACKGROUND OF THE INVENTION

The clinch or bloodknot is considered one of the strongest knots for securing a fishing line to a fish hook. Bloodknots are very strong and relatively easy to tie. The most difficult part of the tying operation involves the formation of about four to six twists of the fishing line before the end of the line is passed through the first twist. The knot is then pulled tight to bind it against the hook eye of the fish hook, and any excess line is trimmed from the end.

The knot tying operation can cause problems for the young or old or people with physical ailments, such as arthritis. Even non-disabled adults struggle in cold conditions or low light conditions. Stabbing injuries when tying lines to hooks are not uncommon.

WO200203926, herein incorporated in its entirety by reference, describes a device that permits the safe tying of a line to a small or medium sized fish hook. Typically, small to medium fish hooks are used in estuary fishing. The use of larger fish hooks typically used in blue-water (open water) fishing with that device is not possible. Even if that device is scaled, it only permits the use of a limited subset of hook sizes used in open water, and a plurality of devices of various sizes would be required to cover the most common range of sizes of fish hooks used in blue-water fishing. This is impractical in practical use.

Another issue with the WO200203926 device is that the round holes in FIG. 1 of that specification permit some hooks that are inserted into the device to have a certain amount of freedom of movement. When the device is scaled up, this can cause the barb of the hook to protrude from the casing and pose a puncture risk to a user or cause the eye of the hook to move about in the device making line tying more difficult. Also, the round holes need to be scaled up for strength when using larger hooks so they do not break off. Even if the round holes are scaled up, they limit the range of sizes of hooks that can be accommodated within the device.

Another difficulty is that the spring clip depicted at FIG. 10 in WO200203926 and described at the bottom of page 8 is not usable in saltwater blue-water environments for any length of time as it tends to rust. The use of rust-resistant spring materials is a relatively expensive replacement.

The device in WO200203926 has been used to tie two lines together, but this results in crimping of the line during tying that can result in weakening and ultimately failure of a line during use.

Nothing above should be read as necessarily falling within the common general knowledge.

DEFINITIONS

In this specification, unless the context indicates the contrary, the following terms have the definitions given to them:

"fish hook" is a device for catching fish that has an eye for tying fishing line to it. The eye is connected to a shank that becomes a bend. The bend terminates at a barbed point. The vector between the shank and the sharp end of the barbed point where the vector is a right angle to the shank is the gap.

"shank thickness" is the thickness of the material of the shank of a fish hook in a cross-sectional plane through the shank defined by the gap of the fish hook.

"tackle" is the equipment used by fishermen when fishing. Almost any equipment or gear used for fishing can be called fishing tackle. For the purposes of the present invention, the tackle needs to be able to be at least partially accommodated within the enclosure of a line tier of the invention. Some examples of tackle items usable in the present invention are fishing line, hooks, and swivels.

"treble hook" is a device for catching fish that has an eye for tying fishing line to it. The eye is connected to a shank that furcates into three bends. The bends each terminate at a barbed point. Each bend is designed to be evenly spaced from the other bends.

"Swivel" is a device consisting of two rings connected to a pivoting joint. The device is usually but not always made of metal, and the pivoting joint is usually but not always ball- or barrel-shaped.

Throughout this specification—the word "comprise", or variations such as "comprises" or "comprising", will be understood to imply the inclusion of a stated element, integer or step, or group of elements, integers or steps, but not the exclusion of any other element, integer or step, or group of elements, integers or steps.

The art-skilled worker will appreciate that the above definitions can and should, with suitable consideration for context, apply to the singular and the plural, and also to the tense of verbs, nouns, adjectives and adverbs derived from the above terms.

SUMMARY OF THE INVENTION

In a first aspect, the present invention provides a line tier for use with a tackle item, comprising:
 a. an enclosure comprising a tackle retention end and a second end opposed to the tackle retention end with a longitudinal axis defined between them, which hook retention end comprises a central portion proximal the longitudinal axis and a peripheral portion lateral to the longitudinal axis;
 b. a rotatable member extending from the second end of the enclosure, the rotatable member permitting rotation of the enclosure about the rotatable member or a portion of the rotatable member;
 c. the enclosure comprising a base portion and a closure portion;
 d. the closure portion being moveable relative to the base portion between an open configuration and a closed configuration;
 e. wherein in the open configuration a tackle item can be inserted into the enclosure such that a portion of the tackle item protrudes from the enclosure;
 f. wherein in the closed configuration, the tackle item can be held in the enclosure and secured therein with a portion of the tackle item protruding from an elongated slot formed in the tackle retention end of the enclosure; and g. wherein a plurality of fishing lines can be held in the enclosure and secured therein with a portion of the fishing line protruding from the enclosure on the tackle retention end and the second end of the enclosure.

In a second aspect, the present invention provides a method for tying a fishing line to a tackle item, comprising:

a. providing a line tier of the first aspect;
b. inserting in the open configuration of the closure portion a tackle item into the enclosure such that a portion of the tackle item protrudes from the enclosure;
c. moving the closure portion to the closed configuration, wherein the tackle item is held in the enclosure and is secured therein so that the tackle item passes through the elongated slot formed in the tackle retention end of the enclosure;
d. providing a fishing line that has a remote portion and a tackle engaging portion, the tackle engaging portion having an end; and
e. engaging the tackle engaging portion of the fishing line with the tackle item by joining the tackle item with the portion of the tackle item that protrudes from the enclosure;
f. joining the tackle engaging portion to the fishing line;
g. retaining the end of the tackle engaging portion and the remote portion such that they are independent of any rotation of the enclosure;
h. twisting the fishing line by rotating the enclosure;
i. forming a loop in the twisted fishing line proximal the tackle item;
j. threading the end of the tackle engaging portion through the loop thereby forming a knot; and
k. tightening the knot by applying tension between the fishing line and the tackle item.

In a third aspect, the present invention provides a line tier comprising:

a. an enclosure comprising a tackle retention end and a second end opposed to the tackle retention end with a longitudinal axis defined between them, which hook retention end comprises a central portion proximal the longitudinal axis and a peripheral portion lateral to the longitudinal axis;
b. a rotatable member extending from the second end of the enclosure, the rotatable member permitting rotation of the enclosure about the rotatable member or a portion of the rotatable member;
c. the enclosure comprising a base portion and a closure portion;
d. the closure portion being moveable relative to the base portion between an open configuration and a closed configuration;
e. wherein in the open configuration a first fishing line can be inserted into the enclosure such that a first portion of the first fishing line protrudes from the enclosure, a second portion of the first fishing line is within the enclosure and third portion of the first fishing line protrudes from the enclosure;
f. wherein in the open configuration a second fishing line can be inserted into the enclosure such that a first portion of the second fishing line protrudes from the enclosure, a second portion of the second fishing line is within the enclosure and third portion of the second fishing line protrudes from the enclosure;
g. wherein in the closed configuration the first fishing line can be held in the enclosure and with the second portion of the first fishing line passing through a first hole formed in the tackle retention end and passing through a second hole formed in the second end of the enclosure; and
h. wherein in the closed configuration the second fishing line can be held in the enclosure with the second portion of the second fishing line passing through a third hole formed in the tackle retention end and passing through a fourth hole formed in the second end of the enclosure.

In a fourth aspect, the present invention provides a method for tying a fishing line to another fishing line, comprising:

a. providing a line tier of the third aspect;
b. inserting in the open configuration a first fishing line into the enclosure such that a first portion of the first fishing line protrudes from the enclosure, which the first portion has an end, a second portion of the first fishing line is within the enclosure and third portion of the first fishing line protrudes from the enclosure;
c. inserting in the open configuration a second fishing line into the enclosure such that a first portion of the second fishing line protrudes from the enclosure, a second portion of the second fishing line is within the enclosure and third portion of the second fishing line protrudes from the enclosure;
d. moving the closure portion to the closed configuration, wherein the each of the second portions of the first and second fishing lines are held in the enclosure;
e. wherein the second portion of the first fishing line passes through a first hole formed in the tackle retention end and passes through a second hole formed in the second end of the enclosure;
f. wherein the second fishing line is held in the enclosure with the second portion of the second fishing line passing through a third hole formed in the tackle retention end and passing through a fourth hole formed in the second end of the enclosure;
g. retaining the end of the first portion of the first fishing line and the first portion of the second fishing line such that they are independent of any rotation of the enclosure;
h. twisting the first fishing line and the second fishing line by rotating the enclosure;
i. forming a gap between the first fishing line and the second fishing line proximal the enclosure;
j. threading the end of the first portion of the first fishing line through the gap thereby forming a knot; and
k. tightening the knot by applying tension between the first fishing line and the second fishing line.

In a fifth aspect, the present invention provides a line tier comprising:

a. an enclosure comprising a tackle retention end and a second end opposed to the tackle retention end with a longitudinal axis defined between them, which hook retention end comprises a central portion proximal the longitudinal axis and a peripheral portion lateral to the longitudinal axis;
b. the enclosure comprising a base portion and a closure portion;
c. the base portion having a channel located along the longitudinal axis, extending at least partially between the tackle retention end and the second end;
d. the closure portion being moveable relative to the base portion between an open configuration and a closed configuration;

e. wherein in the open configuration a tackle item can be inserted into the enclosure such that a portion of the tackle item is inside the channel and another portion of the tackle item protrudes from the enclosure; and f. wherein in the closed configuration, the tackle item can be held in the enclosure and secured therein with a portion of the tackle item protruding from an elongated slot formed in the tackle retention end of the enclosure.

In a sixth aspect, the present invention provides a method for tying a fishing line to a tackle item, comprising:

a. providing a line tier of the fifth aspect;

b. inserting in the open configuration of the closure portion a tackle item into the enclosure such that a portion of the tackle item is inside the channel, a further portion of the tackle item is otherwise generally located within the enclosure and another portion of the tackle item protrudes from the enclosure;

c. moving the closure portion to the closed configuration, wherein the tackle item is held in the enclosure and is secured therein so that the tackle item passes through an opening formed in the tackle retention end of the enclosure;

d. providing a fishing line that has a remote portion and a tackle engaging portion, the tackle engaging portion having an end; and e. engaging the tackle engaging portion of the fishing line with the tackle item by joining the tackle item with the portion of the tackle item that protrudes from the enclosure;

f. joining the tackle engaging portion to the fishing line;

g. retaining the end of the tackle engaging portion and the remote portion such that they are independent of any rotation of the enclosure;

h. twisting the fishing line by rotating the enclosure;

i. forming a loop in the twisted fishing line proximal the tackle item;

j. threading the end of the tackle engaging portion through the loop thereby forming a knot; and k. tightening the knot by applying tension between the fishing line and the tackle item.

BRIEF DESCRIPTION OF THE DRAWINGS

The invention is described below with reference to examples. The examples are only preferred embodiments of one or more ways that the invention can be carried out and should not be read as limiting the scope of the invention.

The examples are provided with reference to drawings, wherein:

FIGS. 7A, 7B, 7C and 7D are sequential diagrammatic views of a method for tying a half blood knot to the eye of the hook;

DETAILED DESCRIPTION OF THE INVENTION

Figure 1:
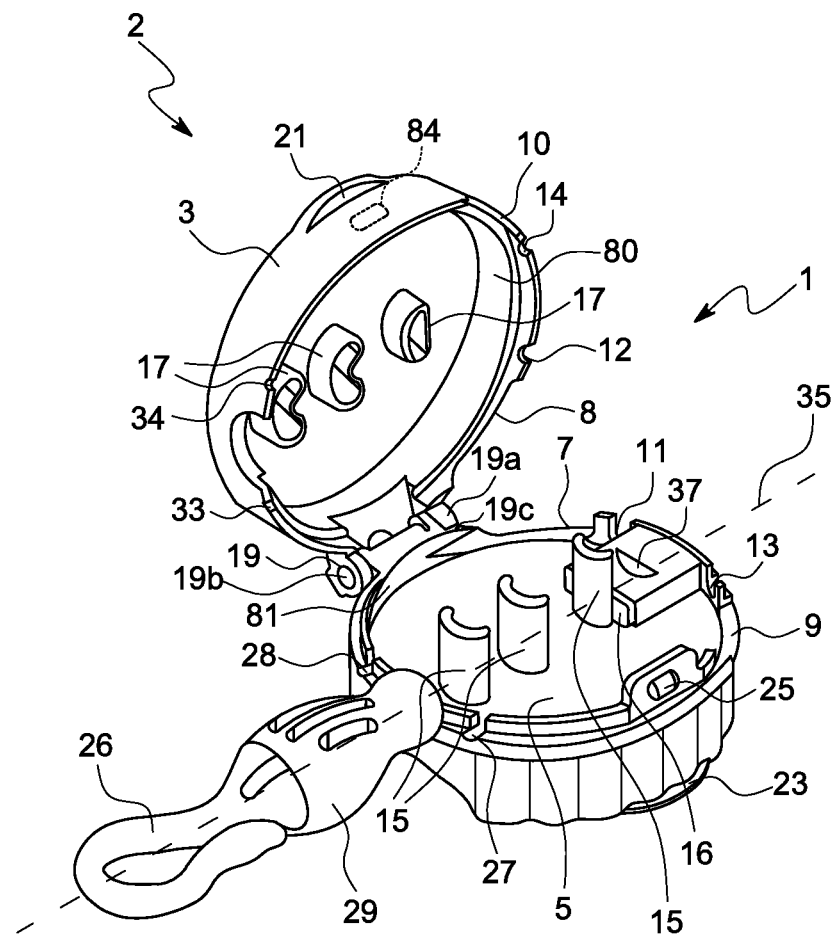
FIG. 1 is a top-side isometric projection of a device of the first embodiment shown in an open configuration.

In relation to the above aspects of the invention, preferably, the elongated slot is formed partly by the base portion and partly by a closure portion when the enclosure is in the closed configuration. More preferably, the slot tapers from the peripheral portion towards the central portion of the tackle retention end such that larger hooks with a large shank thickness are able to be accommodated towards the peripheral portion thereof and smaller hooks with a smaller shank thickness are able to be accommodated towards the longitudinal axis side thereof.

In one embodiment, proximal but separated from the elongated slot is a tackle retention end aperture formed partly by the base portion and partly by a closure portion when the enclosure is in the closed configuration. This is usable, for example, as a swivel retention means enabling the insertion and securing of the end of a swivel with a loop such that one side of the loop is retained in the elongated slot and the other side of the loop is accommodated in the tackle retention end aperture.

If the elongated slot is tapered toward the central portion, then the tackle retention end aperture is preferably located towards the central portion of the elongated slot such that larger loops are able to be retained within the slot but smaller loops with thinner material thicknesses are also able to be accommodated without too much play.

It is preferred for the elongated slot and tackle retention end aperture (where present) to be mirrored (duplicated) either side of the longitudinal axis.

In a further preferred embodiment, a second end aperture is formed in the second end of the enclosure. This enables, for example, the insertion of line through these aperture during line tying without crimping the line between the base portion and the closure portion in the closed configuration. It is more preferred that two second end apertures are provided and spaced on either side of the separately rotatable member.

Preferably, inside the enclosure are a plurality of laterally extending hook-engaging members on the base portion. Preferably, there are complementary laterally extending features on the closure portion that engage with the laterally extending hook-engaging members on the base portion when the enclosure is in the closed configuration.

More preferably, the laterally-extending hook-engaging members are arcuate.

The laterally extending hook-engaging members are preferably used to engage with a hook inserted into the enclosure in the open configuration and keep it secured when the enclosure is in the closed configuration.

Ideally, the laterally extending hook-engaging members should be kept relatively thin to maximise the space available for the insertion of fish hooks into the enclosure but without compromising structural integrity of the laterally extending hook-engaging members during usual operational use. Alternatively the hook-engaging members can be moved around inside the base to accommodate a variety differently shaped fish hooks.

The arcuate shape has been found to more readily secure a variety of hook shapes and sizes than a straight member and maximise structural integrity and minimise space utilisation.

The enclosure can provide a line cutter. This can conveniently be located within the enclosure and only accessible by the user in the open configuration so that it is not exposed when the enclosure is in the closed configuration, thereby minimising the chances of it accidentally snagging on objects, such as threads in a user's pocket. It is most preferably located proximal the central portion of the tackle retention end.

In another preferred embodiment, the enclosure is provided with a bottle opener. If a bottle opener is provided, then the part of the device that it is located on must be made of a suitably durable plastics or cast metal material. A currently preferred material is ABS. A cut-out can be provided in the bottle opener to enable the removal of bottle tops that may otherwise get jammed in the bottle opener. In a currently preferred embodiment, the bottle opener is provided on the outside of the base portion of the enclosure.

In another preferred embodiment, the enclosure is ovoid with the larger dimension in the longitudinal axis dimension, which permits larger hooks to be inserted into the line tier without substantially increasing the size of the device than would otherwise be case if it were round.

The rotatable member is preferably connected to the enclosure by way of a bearing, more preferably a ball and socket joint. In one embodiment, the rotatable member has a hook at its free end that can be attached to a belt loop of a pair of pants of a user or a guide of the fishing rod or anywhere else that hookable and is convenient for a user. In a particularly preferred embodiment, the rotatable member is a finger ring, more preferably a finger ring connected to the enclosure by a swivel.

In an alternative embodiment, the rotatable member is connected to the enclosure by way of at least one elastomeric length of material. The elastomeric length of material is ideally saltwater resistant, such as latex rubber used in speargun rubber.

The different parts of the line tier can be composed of different materials with different properties, such as strength, density and colour. It is currently preferred that the device be made from materials selected from the group consisting of: ABS, polycarbonate and polypropylene, but other materials can be chosen for aesthetics and longevity, including metals (such as cast aluminium) or metallised plastics. The cutter is typically composed of metal. It is particularly preferred that the materials chosen float on water to enable retrieval of the line tier if it falls into water.

Preferably the device, the base portion, the closure portion, and the rotatable member are fabricated as separate units by injection moulding. Subsequently those units are assembled into the final product. Although such a fabrication method is preferred in view of low costs involved, those skilled in the art will recognise that the functions required of the enclosure can also be accomplished where the enclosure is made from different materials, such as metal. Transparent or photoluminescent materials may be useful in some applications, for example when the user is fishing in low light conditions.

Preferably, a hook size suitable for use in blue-water fishing can be used in the device, more preferably a 10/0 hook down to a 1/0 hook.

Preferably, a jig head suitable for blue-water fishing can be used in the device, more preferably a 10/0 jig head down to a 1/0 jig head.

Preferably, the method for tying the knot has two or more loops or gaps that are threaded.

Preferably, monofilament fishing lines up to 150 lbs can be used in the device.

In relation to the fifth and sixth embodiments, preferably the channel is stepped, thereby permitting the insertion of a variety of tackle items. The tackle item is preferably a treble hook, wherein in use 2 of the treble's 3 hooks are located outside of the channel but within the enclosure and the third hook is located within the channel. The channel is preferably narrow to assist in the retention of the tackle item, but can also be made broader for aesthetic appeal.

EXAMPLES

The invention is described below with reference to examples. The examples are only preferred embodiments of one or more ways that the invention can be carried out and should not be read as limiting the scope of the claimed invention.

Example 1

With reference to FIG. 1, a line tier device 1 is depicted. The device 1 comprises an enclosure 2 having a base portion 5, composed of ABS, attached to a closure portion 3, composed of polycarbonate, by way of a hinge 19. The device 1 is 80 mm long measured from extreme ends on a longitudinal axis 35 and is 40 mm wide measured from extreme ends on a lateral axis. The device 1 can accommodate a hook having maximum size of 10/0. The base portion 5 of the enclosure 2 has a shaft 29 projecting from second end of the base portion 5. The hinge 19 connecting the closure portion 3 to the base portion 5 lies to one side of the base portion 5 with respect to the shaft 29. The hinge 19 has a barrel portion 19a projected from the closure portion 3. A pin portion 19b is projected from the base portion 5, wherein the pin portion 19b engages the barrel portion 19a through a notch 19c, thereby coupling together the base portion 5 with the closure portion 3.

As shown in this embodiment, the base portion 5 has a generally flat top surface from which project a plurality of laterally extending male hook-engaging members 15 disposed on a longitudinal axis between the tackle retention end and the second end.

The closure portion 3 has an inner surface which, when the enclosure 2 is in the closed configuration, has a facing relationship with the top of the base portion 5. The inner surface of the closure portion 3 has a plurality of laterally extending female features 17 that complement and engage with the hook engaging members 15 when the enclosure 2 is in the closed configuration. The closure portion 3 has a slightly indented outer surface 95 which accommodates a sticker bearing a logo.

The base portion 5 of the enclosure 2 has a tongue 25 projecting laterally from a peripheral wall 81 of the base portion 5 directly opposite from the hinge 19. To secure the enclosure 2 in the closed configuration, the tongue 25 engages with a cavity 84 that is located on an internal surface of a peripheral wall 80 of the closure portion 3 directly opposite the hinge 19.

A top tab portion 21 is projecting transversely in form of an arch on the opposite side of the closure portion 3 from the hinge 19. Bottom tab portion 23 is projecting transversely in form of an arch on the opposite side of base portion 5 from the hinge 19. When the enclosure 2 is in the closed configuration the top tab portion 21 and bottom tab portion 23 face each other, the user can open the enclosure 2 by applying pressure to the said tab portions thus separating the closure portion 3 and base portion 5, thereby the enclosure 2 is in open configuration.

The peripheral wall 80 and the peripheral wall 81 form a cavity within the enclosure 2 when in the closed configuration. The peripheral wall 80 and the peripheral wall 81 have a plurality of notches which form apertures when the enclosure 2 is in closed configuration by defining a junction 31, this will be described further.

Figure 2:
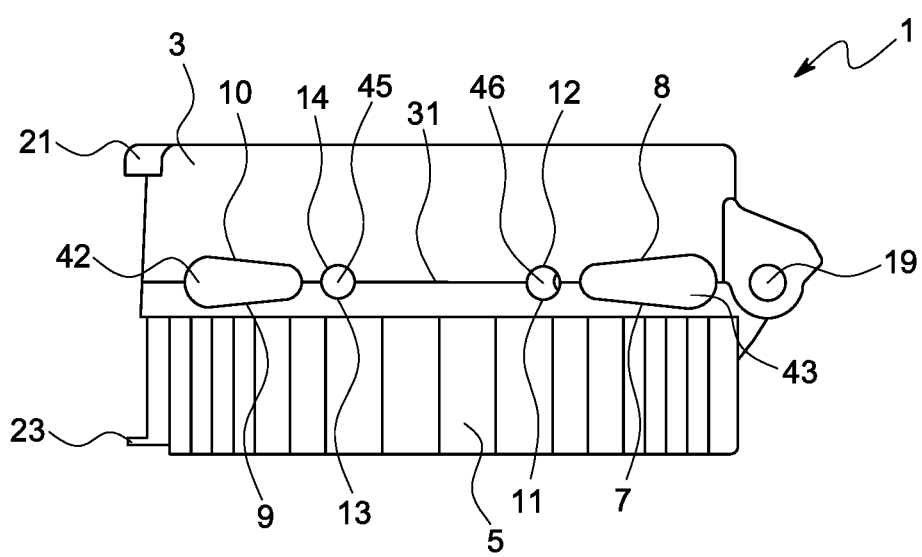
FIG. 2 is a longitudinal top plan view of FIG. 1.

With reference to FIG. 2 an elongated slot 42, 43 is formed by combining peripheral wall 80, 81 when the enclosure 2 is in closed configuration. The peripheral wall 80 has an elongated notch 8, 10 disposed on its edge such that notch 8 is located adjacent to the hinge 19 and notch 10 is mirrored from notch 8 position by being on the opposite side of the longitudinal axis. The peripheral wall 81 has an elongated notch 7, 9 that match notches 8, 10 respectively when the enclosure 2 is in closed configuration, thus forming an elongated slot 43, 42. The elongated slot 43, 42 tapers from the peripheral portion of the enclosure 2 towards its central longitudinal axis.

In order to enable the enclosure 2 of the device 1 to accommodate various different sizes of fish hooks, a plurality of male hook engaging members 15 and corresponding extending female features 17 are provided and spaced at various distances along the longitudinal axis of the device 1. For example, a small fish hook is placed around the hook engaging member 15 closest to the tackle retention end. Whereas a larger hook might be placed around the hook engaging member 15 that is closest to second end.

The hook engaging members 15 have an arcuate shaped projection to readily secure a variety of hook shapes and sizes than a polygonal cross-sectional shaped member. This maximises the structural integrity and minimises space utilisation of the hook engaging members 15 within the enclosure 2.

The elongated slots 43, 42 accommodate a range of different hook sizes or lengths. The slot tapers from the peripheral portion towards the central portion of the device 1 to accommodate large hooks towards the peripheral portion, whereas smaller hooks are accommodated towards central portion. The tapering of the elongated slots 43, 42 provides stability while housing different sized hooks with different shank thickness and minimises hook wobbling.

A tackle retention end aperture in form of a hole 46, 45 is formed by combining peripheral wall 80 and 81 in closed configuration. The hole 46, 45 is formed in the same way like the elongated slot 43, 42 as described previously. The peripheral wall 80 has notches 12 and 14 in form of a semicircle disposed on the edge and on opposite sides of the longitudinal axis respectively. The peripheral wall 81 has notches 11 and 13 in form of a semicircle disposed on the edge such that when the enclosure 2 is in closed configuration the notches 12, 14 combine with the notches 11, 13 respectively to create the hole 46, 45 respectively. In relation to the elongated slot 43, 42, the hole 46, 45 is positioned towards the centre of the longitudinal axis of the enclosure 2 while the elongated slot 43, 42 is positioned near the peripheral portion. The circular form of the hole 46, facilitates accommodation of the fishing tackle. The elongated slot 42, 43 and the hole 45, 46 respectively enable retention and securing a swivel such that one side of the swivel is retained in the elongated slot 42 and the other side of the swivel is retained by the hole 45, or alternatively elongated slot 43 and hole 46.

The peripheral wall 80 has two semicircular notches 33 and 34 disposed on its edge of the opposite sides of the longitudinal axis adjacent to the second end of the peripheral wall 80. The peripheral wall 81 has two semicircular notches 28 and 27 disposed along the edge of the wall 81 adjacent to the shaft 29. The holes 48 and 47 are formed when the enclosure 2 is in closed configuration wherein the notches 33 and 28, and notches 34 and 27 are joined with the junction 31 formed.

With reference to FIG. 1, on the surface of the base portion 5 disposed adjacent to the tackle retention end on the longitudinal axis provided is a small line cutter in form of a cutting blade 37 for trimming an end portion 50 of a fishing line 40 following the knot formation. Such a cutting device is formed from a pressed sheet metal. The cutting blade 37 is affixed to a rectangular bed 16 projecting from the surface of the base portion 5 adjacent to the tackle retention end on the longitudinal axis. The internal location of the cutting blade 37 when the enclosure 2 is in closed configuration facilitates a sheath thereby protecting the user and items from possible accidental cuts should the cutting blade 37 be exposed when in storage, for example threads inside a clothing pocket.

A rotatable member 26 in form of a hook attaches snugly by way of a bearing in the form of a ball and socket joint (not shown) to the shaft 29 and is able to rotate about the longitudinal axis.

The device 1, the base portion 5, the closure portion 3, and the rotatable member 26 are fabricated as separate units by injection moulding. Subsequently those units are assembled into the final product.

Figure 4:
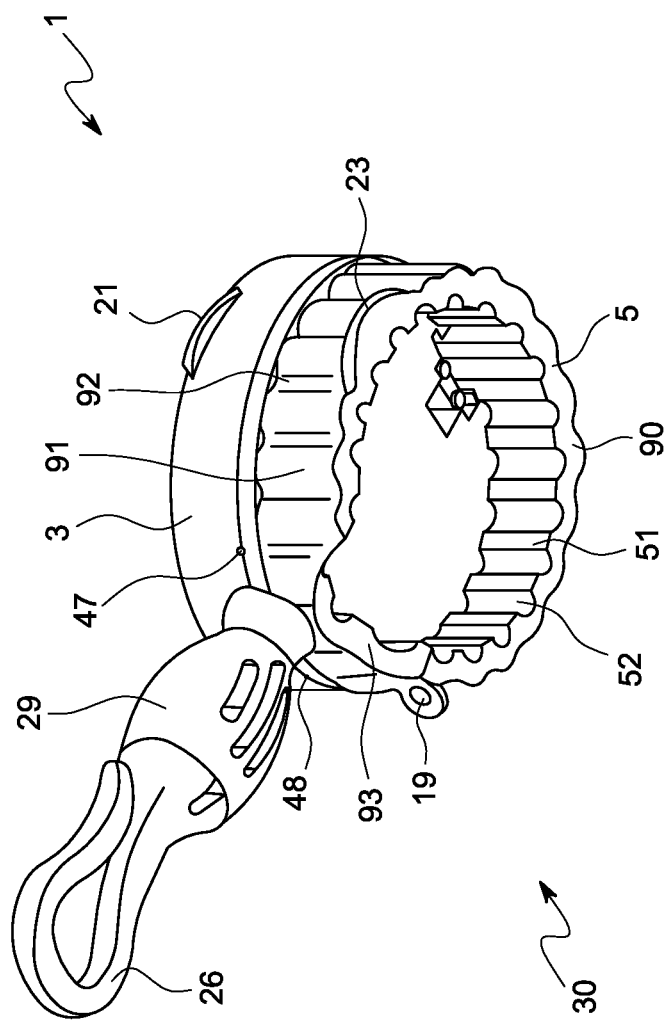
FIG. 4 is an underside isometric projection of the device of the first embodiment shown in a closed configuration.

With reference to FIG. 4 there is depicted an underside view of the device 1. Not all reference numerals will be redescribed here in the interest of succinctness. A bottle opener, generally indicated as 30, has a peripheral wall 90 is projecting from a bottom surface circumference of the base portion 5 with enough projection distance to engage completely a bottle sealing device in form of a bottle top. The inner surface of the peripheral wall 90 has symmetrically inner corrugated ribs 52 alternating with symmetrically outer corrugated ribs 51. The outer surface of the peripheral wall 90 has symmetrically outer corrugated ribs 91 alternating with symmetrically inner corrugated ribs 92. At the second end, the peripheral wall 90 has a cut-out 93 in form of a semicircular notch having its arch located at the mid-point of the peripheral wall 90.

It should be borne in mind, when considering the selection of appropriate materials with which to construct the device 1, that the device will often find use in salt water environments, and thus metal materials or coatings which are resistant to salt water corrosion and rust are preferred.

Figure 3:
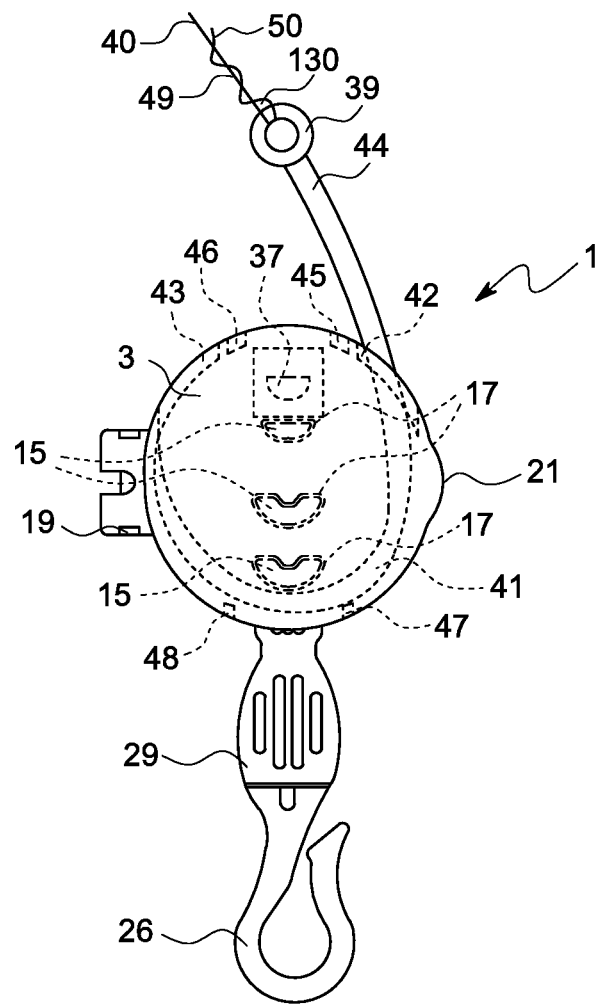
FIG. 3 is a plan view of the device of the first embodiment in closed configuration.

With reference to FIG. 3 and FIG. 7, a preferred procedure for safely tying the fishing line 40 to the hook 41 will be described. The enclosure 2 is arranged in the open configuration and the hook 41 is placed onto the base portion 5 and the elongated notch 9 receiving a shank 44 of the hook 41.

The enclosure 2 of the device 1 is arranged to the closed configuration by engaging the closure portion 3 with the base portion 5 wherein the tongue 25 and the cavity 84 engage causing the enclosure 2 to be secured while in the closed configuration. The hook 41 is secured within the enclosure 2 and the shank 44 of the hook 41 now passes through the elongated slot 42.

A fishing line 40 comprises a remote portion, and a tackle engaging portion 49 that includes an end portion 50. In step 1 the tackle engaging portion 49 is threaded through an eye 39 of the hook 41. Subsequently the end portion 50 is joined to the tackle engaging portion 49 by pinching with fingers of left hand of the user.

The user places the device 1 in an upward facing position into his right hand and grasps the rotatable member 26 such to enable independent rotation of the enclosure 2 with respect to the rotatable member 26. Step 2 is to have the enclosure 2 rotated 4 times in a clockwise direction thereby creating twists in the joined portions 49 and 50. As a result of the twists a loop 130 is formed adjacent the eye 39. In step 3, the end portion 50 is threaded through the loop 130 tightly. In step 4 the end portion 50 is tightened and the knot is secured.

The user arranges the enclosure 2 into the open configuration by separating the base portion 5 and the closure portion 3 using top tab portion 21 and the bottom tab portion 23. The user then optionally further tightens the knot by applying force to the fishing line 40 and the hook 41 to secure the knot to the hook 41. Finally, the end portion 50 is removed by cutting it with the cutting blade 37.

Figure 11:
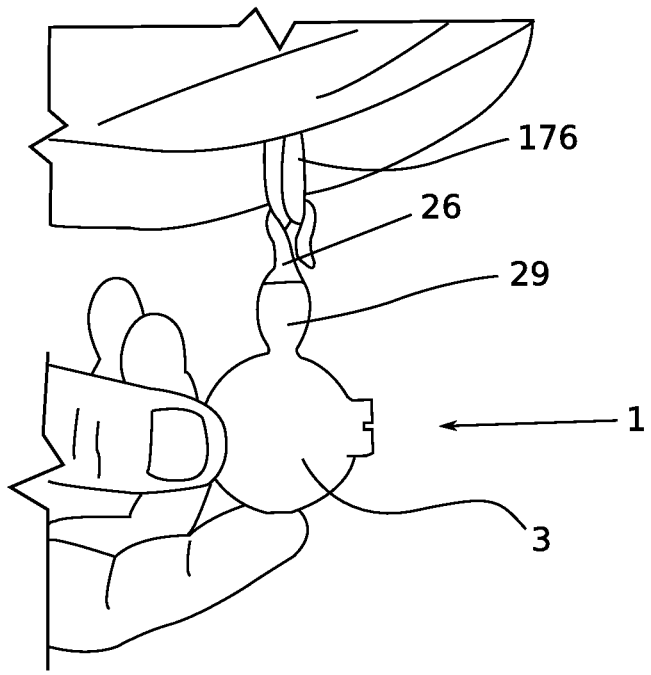
FIG. 11 is a top view of the device attached to a belt loop in use during knot tying operation.
Figure 12:
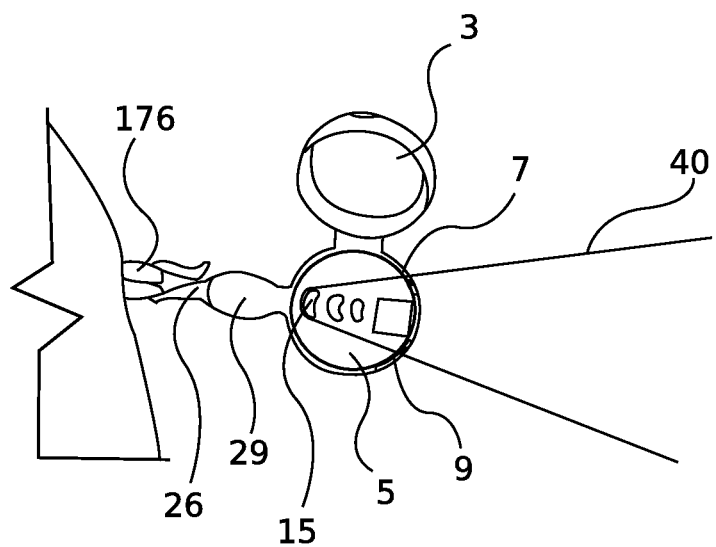
FIG. 12 is a top view of the device attached to a belt loop arranged in an open configuration during a knot tying operation.

With reference to FIGS. 8, 11 to 14 in another preferred aspect a bimini twist knot is made. The device 1 is secured preferably to a belt loop 176 of pants via the rotatable member 26 free end, as depicted in FIG. 11. The enclosure 2 is in open configuration and the fishing line 40 is placed onto the elongated notch 9, then looping around the hook engaging member 15 and finally onto the elongated notch 7. The closure portion 3 is moved so as to have the enclosure 2 in closed configuration.

Figure 13:
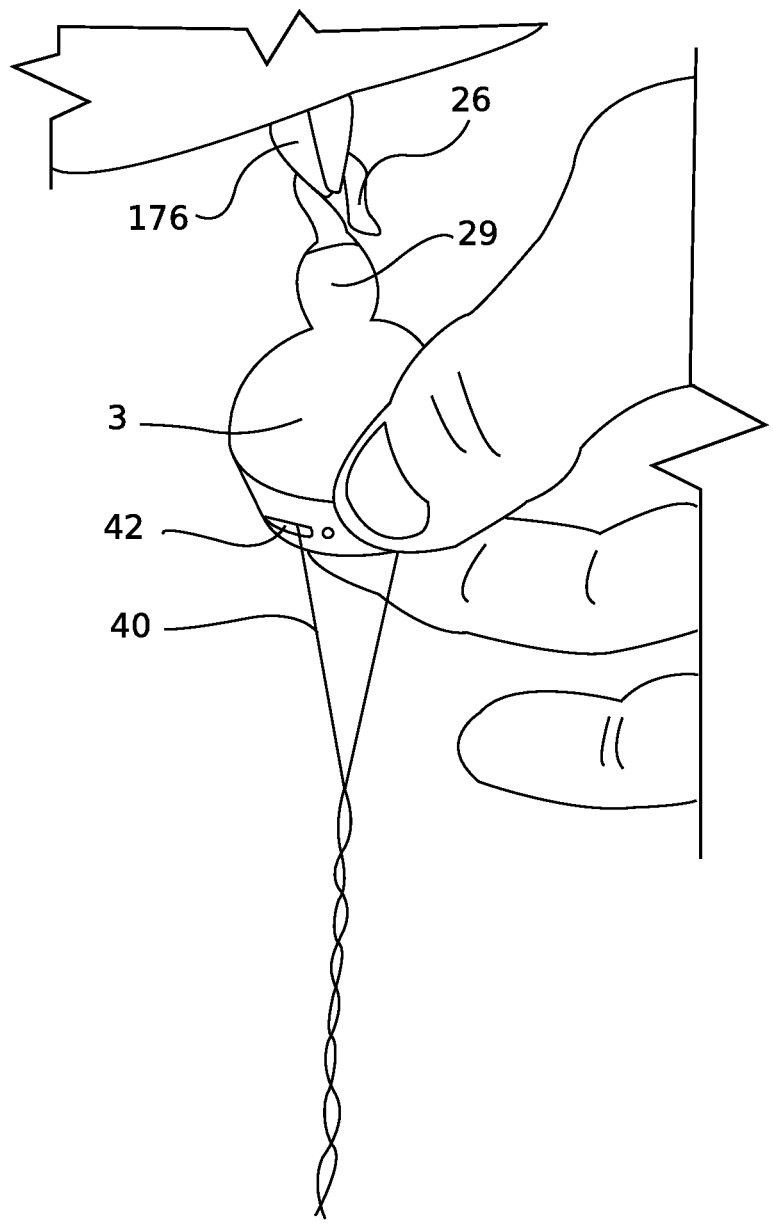
FIG. 13 is a top view of the device attached to a belt loop during knot tying operation.
Figure 14:
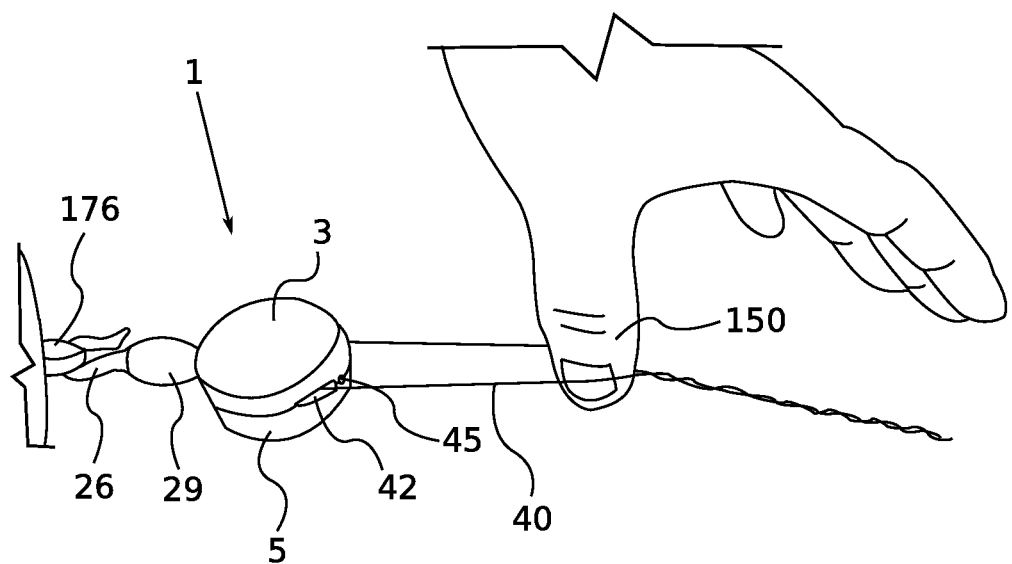
FIG. 14 is a top view of the device attached to a belt loop during a knot tying operation.
Figure 15:
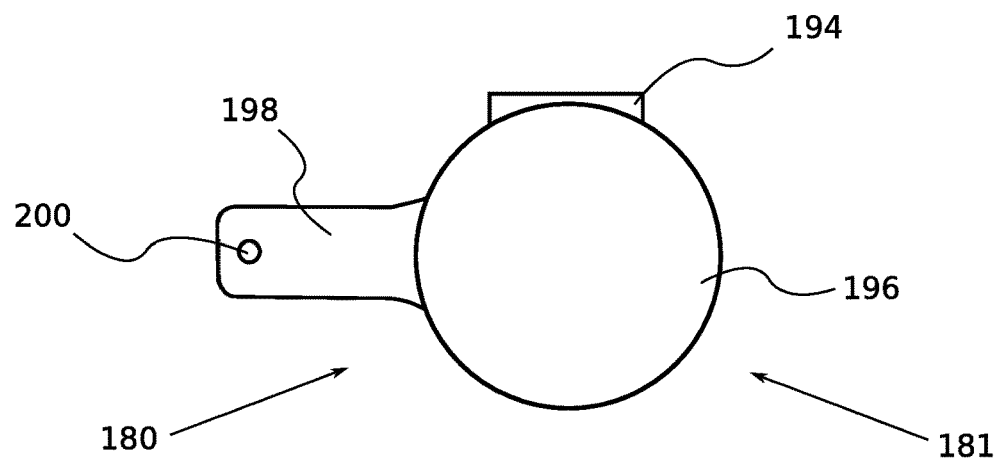
FIG. 15 is a top view of the device of the third embodiment.
Figure 16:
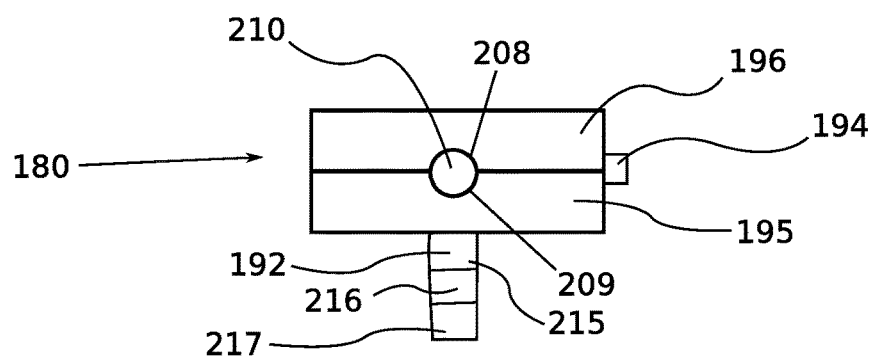
FIG. 16 is a front view of the device of the third embodiment.
Figure 17:
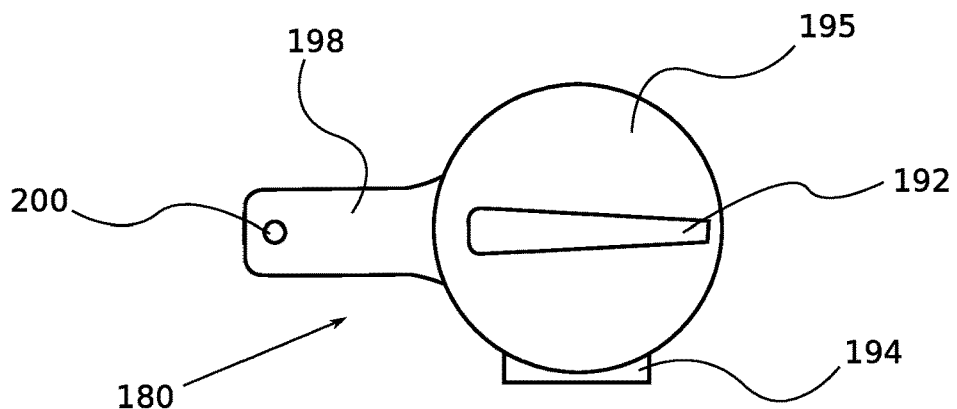
FIG. 17 is a bottom view of the device of the third embodiment arranged in closed configuration.

In step 1 the user rotates the enclosure 2 twenty or forty times causing twenty or forty twists respectively to form in the fishing line 40, the results of this action are depicted in FIG. 13. In step 2 a force is applied by a thumb 150 travelling away from the device 1 on the longitudinal line to compress and bring twists close together such that the twists twist on each other, this action is demonstrated in FIG. 14. In step 3 a half hitch is performed by having the end portion 50 looping around portion 161 into a loop 140 then out from the loop 140 and into a resulting loop 141. The end portion 50 is then tightened. In step 4 another half hitch is performed by having the end portion 50 looping around portion 162 into the loop 140, then out from the loop 140 and into a resulting loop 142. The end portion 50 is then tightened. In step 5 a half hitch is performed by having the end portion 50 loop around the loop 140 and through a resulting loop 149, subsequently the end portion is tightened, this half hitch is performed two more times to finally create a bimini twist.

Optionally, the enclosure can be moved to the open configuration and the fishing line having the bimini twist removed for operation. Finally the cutting blade 37 may be used to trim the end portion 50 to neaten the knot for use.

For most commonly used relatively small fish hooks, the device 1 may be about the size slightly larger than a beer bottle top or the like. It will be readily apparent from the detailed description which follows, however, that the device 1 may alternatively be constructed larger or smaller to suit different sizes of fish hooks.

With reference to FIG. 4 a preferred procedure for unscrewing the bottle top is described. In operation the bottle opener, generally indicated as 30, is placed over the sealed bottle top (not shown), wherein peripheral wall 90 snugly covers the bottle top and the ribs 52 and 51 engage the alternating inner and outer ribs of the bottle top. The user subsequently twists the device 1 to unseal the bottle top and consume the beverage. At times the bottle top may become jammed inside the peripheral wall 90 after the disengagement of the bottle top from the bottle. To remove the bottle top, the user can insert an object such as a fork or finger into the cut-out 93 to apply a force to the bottle top to free it. The device 1 provides a convenient way to unseal the bottle top because it affords high torque and grip for slippery hands whilst twisting off the bottle top.

Figure 5:
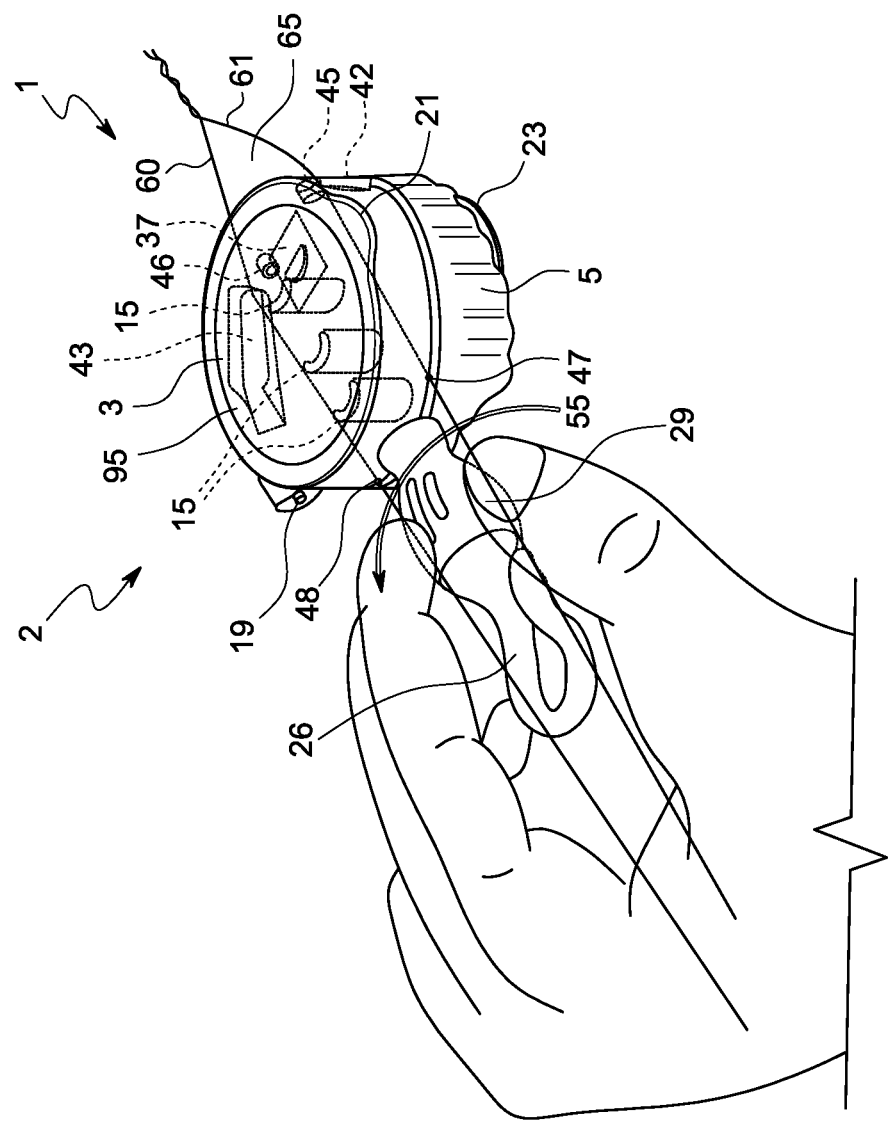
FIG. 5 is a top-side isometric projection of the device in use during a knot tying operation.

With reference to FIG. 5 a preferred procedure for tying fishing line to another fishing line using the device 1 is described.

The device 1 is placed into a hand of the user and the user grasps the rotating member 26 with his finger(s) that make it comfortable to hold the device. Subsequently the enclosure 2 is arranged in the open configuration.

The user subsequently inserts a first fishing line 60 on elongated notch 7 and notch 28 longitudinally having the shorter portion of the line extending from the tackle retention end and the longer portion of the line extending from the second end. A second fishing line 61 is inserted over elongated notch 9 and notch 27 longitudinally and the longer portion of the line extending from the tackle retention end and the shorter portion of the line extending from the second end. The user then arranges the enclosure 2 in the closed configuration which causes the first fishing line 60 now to be in hole 48 and elongated slot 43 and the second fishing line 61 now to be in hole 47 and elongated slot 42.

The first and second fishing lines 60, 61 protruding from the tackle retention end are grasped together by user's other hand. Subsequently the enclosure 2 of the device 1 enclosing the fishing lines is rotated by rolling four times the shaft 29 between the grasping finger and thumb as indicated by an arrow 55, thereby forming four twists of the fishing line at the tackle retention end.

The end of the first fishing line 60 is inserted, without tension, into a loop 65 that is located adjacent to the tackle retention end. This causes another loop to be made and subsequently the end of the first fishing line 60 is inserted into another loop tightly causing a knot to form. The user unwinds by rotating the enclosure 2 in a reverse direction from that described above.

The enclosure 2 is arranged in an open configuration via the use of top tab portion 21 and bottom tab portion 23. The fishing lines are taken out and the first fishing line 60 is inserted into elongated notch 7 and notch 28 with the shorter end of the fishing line projecting from the second end. The second fishing line 61 is inserted into elongated slot 9 and notch 27 with the shorter end of the fishing line projecting from the tackle retention end.

The previously described procedure for tying a knot is repeated again. The enclosure 2 is rotated 4 times as described previously causing a loop to be formed adjacent to the tackle retention end. The end of the second fishing line 61 is inserted without tension into the loop. This causes another loop to be formed and the end of the second fishing line 61 is inserted into another loop tightly causing a knot to form. The user unwinds and arranges enclosure 2 to open configuration and removes the fishing lines. Grasping the first fishing line 60 in one hand and the second fishing line 61 in other hand, the user has the knots between their hands and the fishing lines are pulled until the lines bind upon themselves, fixing the knot.

Advantageously, the cutting blade 37 is then used to trim the fishing line end following the knot formation.

Figure 9:
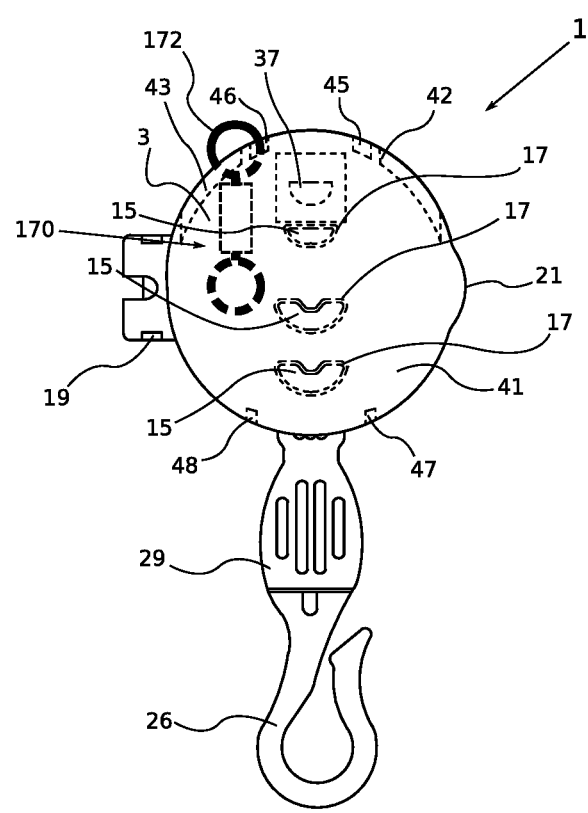
FIG. 9 is a plan view of the device of the first embodiment arranged to hold a swivel.

With reference to FIG. 9 a procedure for retaining a swivel 170 with a loop 172 in the device 1 will be described. The loop 172 of the swivel 170 is analogous to the eye 39 of the hook 41 for the purpose of tying the fishing line 40 to the loop. The enclosure 2 is arranged in an open configuration. The swivel 170 up to length of 30 mm is inserted onto the base portion 5 of the device 1. The loop 172 is inserted onto the elongated notch 7 and onto the notch 11. If the length of the swivel 170 is larger than 30 mm then the swivel 170 is positioned outside the device 1 and the loop 172 is placed onto elongated notch 7 and onto the notch 11.

Subsequently the enclosure 2 is arranged in closed configuration and the loop is secured in the elongated notch 43 and the hole 46. This arrangement prevents the loop of the swivel from rotating with respect to the device 1, which is required in order to enable twists in the fishing line 40 to be formed using the procedure describe above for tying the fishing line 40 to the eye 39 of the hook 41.

Example 2

Figure 6A:
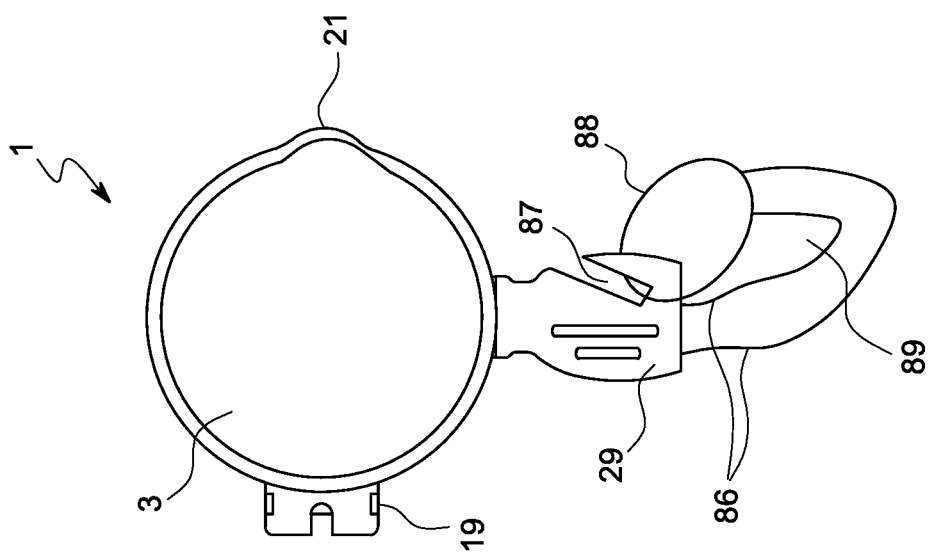
FIGS. 6A and 6B are plan views of the device of the second embodiment shown in an open, relaxed configuration (FIG. 6A) and in a closed, looped configuration (FIG. 6B)
Figure 6B:
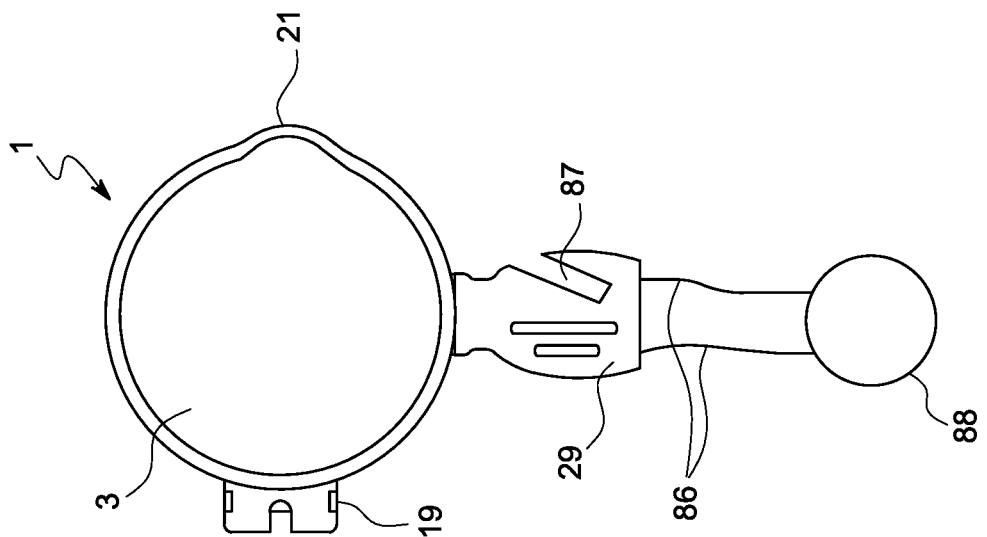
Figure 8A:
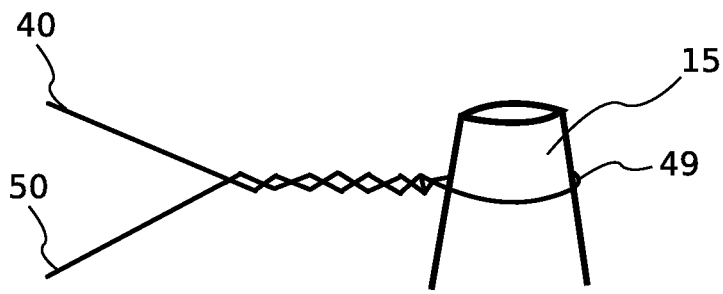
FIGS. 8A, 8B, 8C, 8D and 8E are sequential diagrammatic views of a method for tying a bimini twist knot for use with fishing tackle.
Figure 8B:
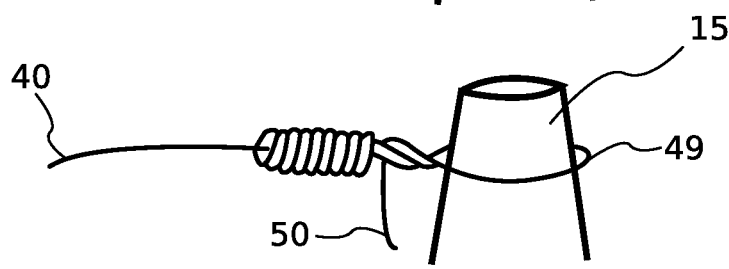
Figure 8C:
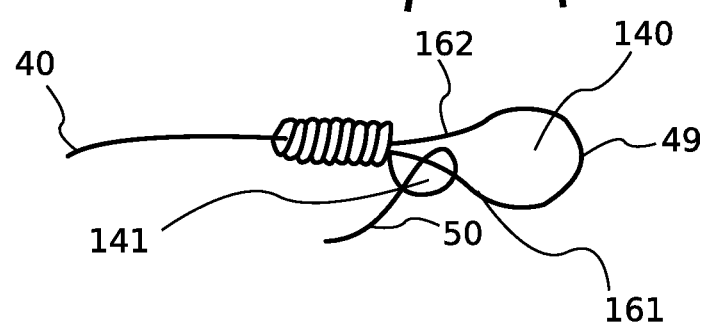
Figure 8D:
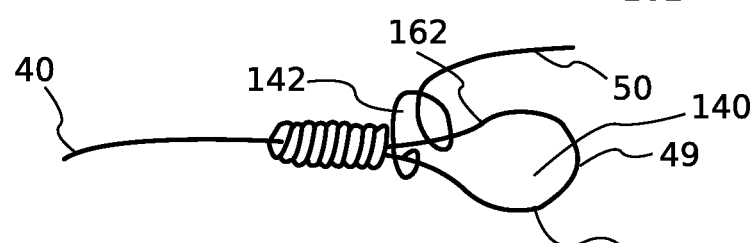
Figure 8E:
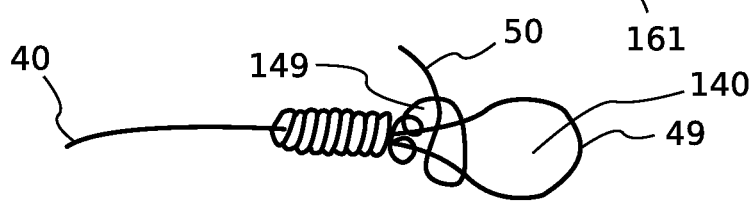

With reference to FIGS. 6A and 6B, the structure of the enclosure 2 is generally the same as previously described in Example 1 except for the replacement of rotatable member 26; base portion 5 (not shown in this view) is composed of cast aluminium; and the closure portion 3 is composed of polypropylene. Not all reference numerals will be redescribed here in the interest of succinctness. The device 1 has a rubber ring 88, with an average radius of the human finger that is coupled to the shaft 29 via elastomeric length material in the form of two speargun rubber (typically latex) bands 86. The rubber bands 86 are 50 mm in length and are 1 mm wide. The shaft 29 has a notch 87 carved in on its side. The notch 87 provides means to secure the rubber ring 88 to the shaft 29.

The notch 87 and the rubber ring 88 serve a dual purpose. First, the device 1 can be secured to the belt loop on pants for further operation, or the device 1 is secured to the guide of the fishing rod while the hook 41 is inside the device 1 to safely isolate the hook from outside environment. Secondly the rubber ring 88 is used as an anchor point while situated on user's ring finger for the operation of the device 1.

In operation the device 1 is anchored to the belt loop (not shown) of a pair of pants (not shown) of a user (not shown) by inserting the rubber ring 88 through the belt loop and inserting the band of the ring 88 into the notch 87. A resulting loop 89 causes the device 1 to be securely attached to pants as illustrated in FIG. 6B. Subsequently, the procedure to make knots as described above is conducted.

In an alternative operation, the first and second fishing lines 60, 61 are threaded into the device 1. The rubber ring 88 is inserted onto the user's ring finger, and the enclosure 2 of the device 1 is rotated a number of times (for example six) in relation to the rubber ring 88 against the bias of the rubber band 86. The enclosure 2 is released, and a number of twists (for example six) are created in the line when the rubber band 86 recoils into its original position. Subsequently, the knots are formed by the previously described procedure.

In another operation the device 1 that encloses hook 41 is anchored to the guide of the fishing rod by inserting the rubber ring 88 through the guide and inserting the band of the ring 88 into the notch 87. The resulting loop 89 causes the device 1 to be securely attached to the guide of the fishing rod.

Example 3

Figure 10:
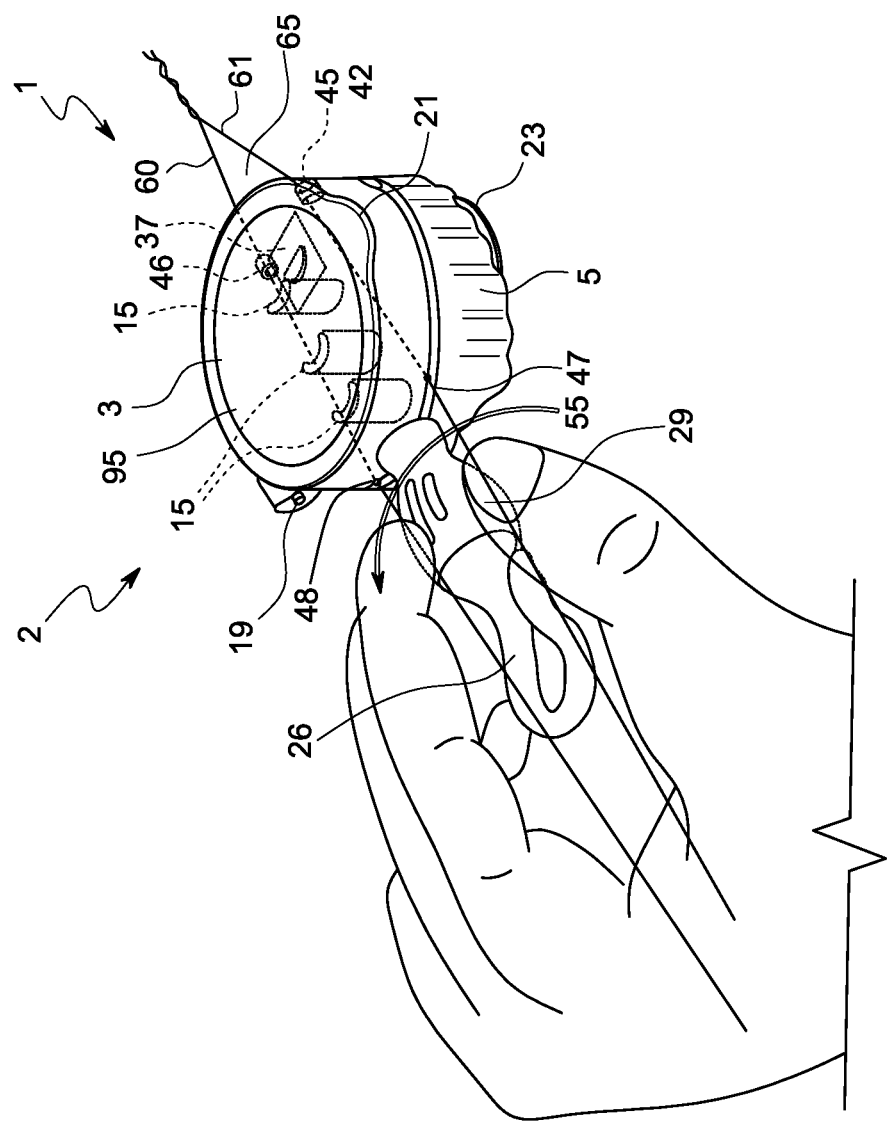
FIG. 10 is a top-side isometric projection of the device in use during a knot tying operation.

With reference to FIG. 10 a preferred procedure for safely tying fishing line to another fishing line using device 1 is nearly the same as described above with reference to FIG. 5, however having two exceptions. Firstly the first fishing line 60 is inserted onto the notch 11 instead of elongated notch 7. Secondly, the second fishing line is inserted onto the notch 13 instead of the elongated notch 9. Thus the first fishing line upon the enclosure 2 arranged in the closed configuration is in the hole 46, while the second fishing line is in the hole 45.

Example 4

With reference to FIGS. 15 to 19 there is depicted a line tier device 180. The device 180 has an enclosure 181 comprising a base portion 195 and a closure portion 196. Projecting into the base portion 195 is a channel 192 that extends between the second end and the tackle retention end on the longitudinal axis. The channel 192 projects beyond the rest of the base portion 195. The channel 192 has three levels of depth that are formed like steps inside the channel 192. This permits three different sizes of hooks (only a medium sized hook 204 is shown) to be received within the channel 192. A member 198 on the longitudinal axis projects from the second end of the base portion 195. There is an opening 200 on the proximal end of the member 198.

The perimeter of the channel 192 in the base portion 195 tapers towards the tackle retention end. This, in use, enables hooks that are larger in size to be inserted closer towards the second end and hooks that are smaller in size are inserted closer towards the tackle retention end while still restricting lateral movement of smaller treble hook bends from occurring within the channel.

The base portion 195 a plurality of female hook engaging members 206 projecting therefrom and arranged in equal quantity, three on each side of the channel 192. The female hook engaging members 206 are cylindrical in form and are larger in size adjacent the second end. The size decreases in the direction towards the tackle retention end of the base portion 195.

On the circumference of the base portion 195 on the longitudinal axis, at the tackle retention end is a semicircular notch 209. The closure portion 196 on the circumference, on the longitudinal axis also has a semicircular notch 208. The enclosure 181 is in closed configuration causes the combination of notches 208, 209 to create an opening 210.

Figure 18:
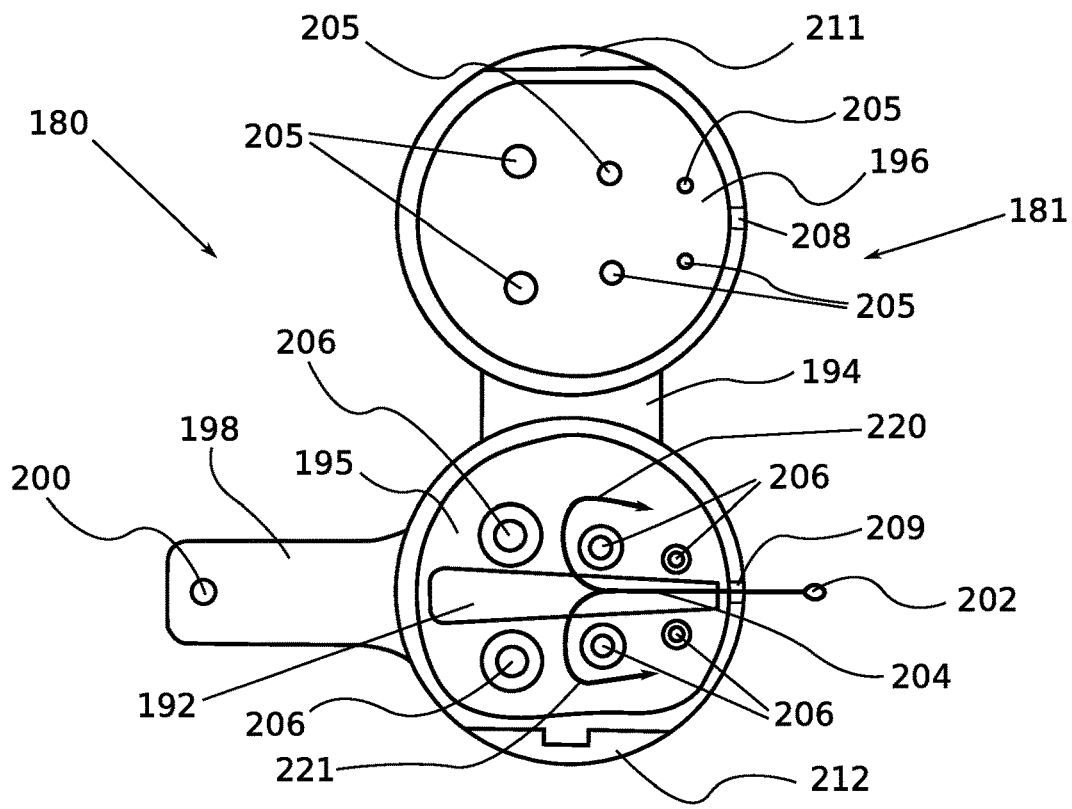
FIG. 18 is a top view of the device of the third embodiment arranged in open configuration with a treble hook inserted.
Figure 19:
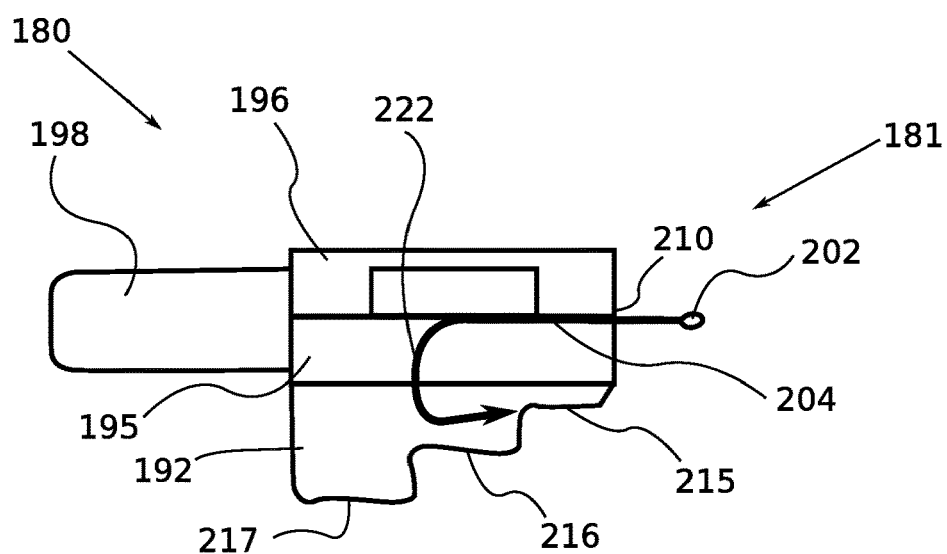
FIG. 19 is a side view of the device of the third embodiment arranged in a closed configuration with a treble hook inserted.

A hinge 194 couples together the base portion 195 and the closure portion 196 and is directly opposite a notch 212. The closure portion 196 is movable relative to the base portion 195 between an open configuration and a closed configuration. In the closed configuration, the closure portion 196 and the base portion 195 are engaged such that the male complimentary features 205 and the female hook engaging members 206 are coupled. The enclosure 181 is in open configuration, as depicted in FIG. 18, and the base portion 195 and the closure portion 196 disengaged. The notch 212 projects from the base portion 195 on the lateral axis of the enclosure 181. The notch 212 assists the operator in configuring the enclosure 181 in the open and the closed configuration.

The closure portion 196 has projecting from the inner surface thereof a plurality of male complimentary features 205 arranged so as to compliment the female hook engaging members 206 when the enclosure 181 is in the closed configuration.

A notch 211 is projecting from the closure portion 196 on the side surface opposite from the hinge 194. The notch 211 is used to assist the user in changing configurations of the enclosure 181.

The channel 192 has three levels of depth in the form of steps; the shallowest is closest towards the tackle retention end and is a first level 215, a second level 216, and a third level 217 being the deepest and closest towards member 198 at the second end.

In use the enclosure 181 of the device 180 is arranged in open configuration, and a treble hook 204 is placed into the base portion 195. A first bend 220 and second bend 221 of the treble hook 204 engage the female hook engaging members 206. A third bend 222 (or bite) of the treble hook 204 is deposited into the channel 192. The shank of the treble hook 204 is projecting from the base portion 195 through a notch 209.

The enclosure 181 is arranged into the closed configuration. The shank of the treble hook 204 is projecting through an opening 210 formed by the combination of notches 208, 209 on the closure portion 196 and base portion 195 respectively. The channel 192 secures the treble hook 204. Different sized levels of the channel can engage different sized hooks. Subsequently, a knot is tied to the eye 202 of the treble hook 204 by a procedure described in previous examples.

Example 5

Figure 20:
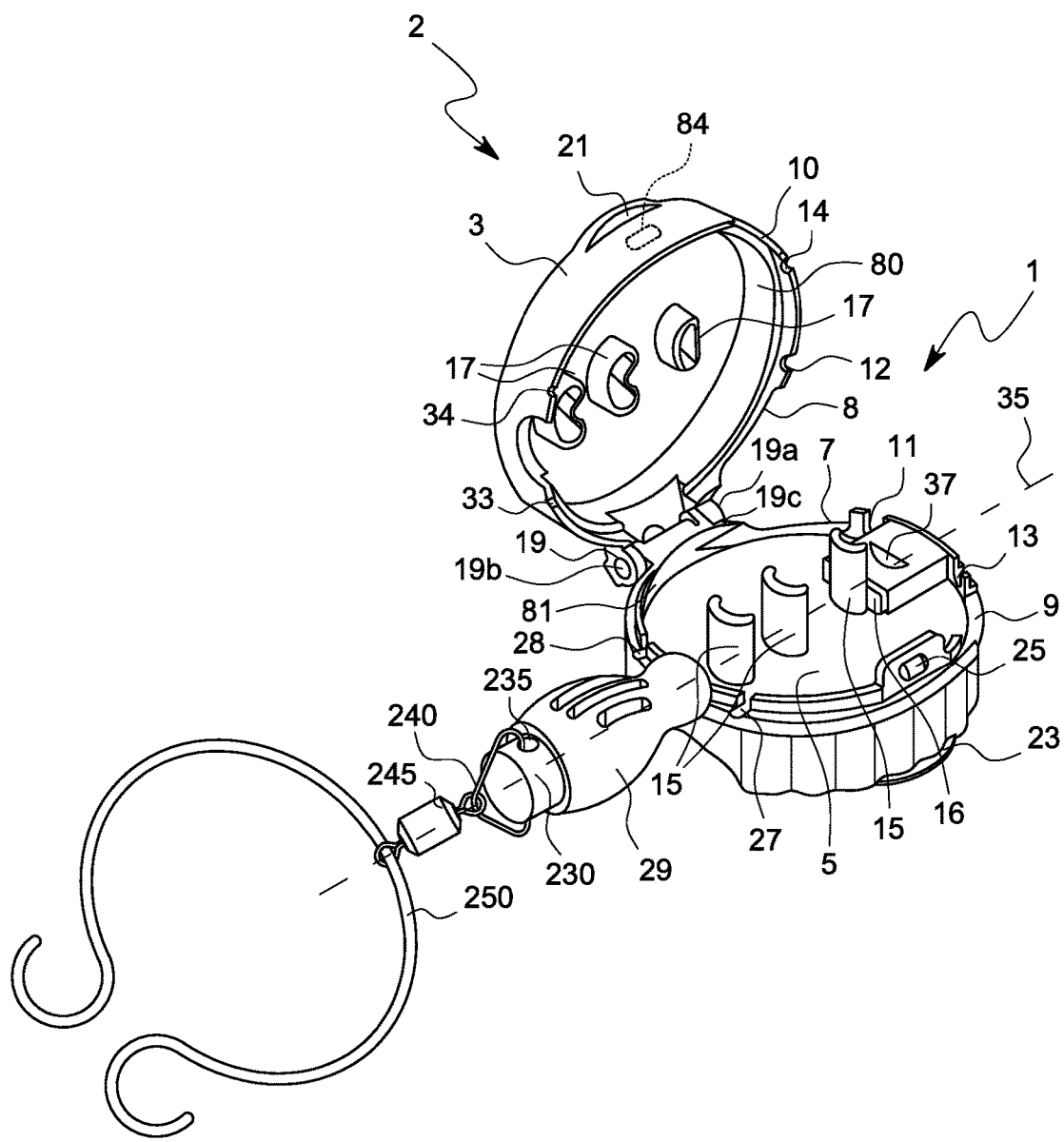
FIG. 20 is a top isometric projection of a device of the first embodiment shown in an open configuration that is the currently most preferred (best) embodiment of the invention.

With reference to FIG. 20, a particularly preferred line tier device 1 is depicted. The same reference numerals used in earlier embodiments are used where the functionality is the same or similar.

The device 1 comprises a plastics enclosure, generally indicated as 2, having a base portion 5 attached to a closure portion 3 by way of a hinge 19. The device 1 can accommodate a hook having a maximum size of 10/0. The base portion 5 of the enclosure 2 has a shaft 29 projecting from the second end of the base portion 5. The hinge 19 connecting the closure portion 3 to the base portion 5 lies to one side of the base portion 5 with respect to the shaft 29. The hinge 19 has a barrel portion 19a projected from the closure portion 3. A pin portion 19b is projected from the base portion 5, wherein the pin portion 19b engages the barrel portion 19a through a notch 19c, thereby coupling together the base portion 5 with the closure portion 3.

As shown in this embodiment, the base portion 5 has a generally flat top surface from which project a plurality of laterally extending male hook-engaging members 15 disposed on a longitudinal axis between the tackle retention end and the second end.

The closure portion 3 has an inner surface which, when the enclosure 2 is in the closed configuration, has a facing relationship with the top of the base portion 5. The inner surface of the closure portion 3 has a plurality of laterally extending female features 17 that complement and engage with the hook engaging members 15 when the enclosure 2 is in the closed configuration. The closure portion 3 has a slightly indented outer surface 95 which accommodates a sticker bearing a logo.

The base portion 5 of the enclosure 2 has a tongue 25 projecting laterally from a peripheral wall 81 of the base portion 5 directly opposite from the hinge 19. To secure the enclosure 2 in the closed configuration, the tongue 25 engages with a cavity 84 that is located on an internal surface of a peripheral wall 80 of the closure portion 3 directly opposite the hinge 19.

A top tab portion 21 is projecting transversely in the form of an arch on the opposite side of the closure portion 3 from the hinge 19. Bottom tab portion 23 is projecting transversely in the form of an arch on the opposite side of base portion 5 from the hinge 19. When the enclosure 2 is in the closed configuration the top tab portion 21 and a bottom tab portion 23 face each other, the user can open the enclosure 2 by applying pressure to the said tab portions thus separating the closure portion 3 and base portion 5, thereby the enclosure 2 is in open configuration.

The peripheral wall 80 and the peripheral wall 81 form a cavity within the enclosure 2 when in the closed configuration. The peripheral wall 80 and the peripheral wall 81 have a plurality of notches which form apertures when the enclosure 2 is in the closed configuration by defining a junction 31; this will be described further.

On the surface of the base portion 5 disposed adjacent to the tackle retention end on the longitudinal axis, provided is a small line cutter in the form of a cutting blade 37 for trimming an end portion 50 of a fishing line 40 following the knot formation. Such a cutting device is formed from a pressed sheet metal. The cutting blade 37 is affixed to a rectangular bed 16 projecting from the surface of the base portion 5 adjacent to the tackle retention end on the longitudinal axis. The internal location of the cutting blade 37 when the enclosure 2 is in closed configuration facilitates a sheath thereby protecting the user and items from possible accidental cuts should the cutting blade 37 be exposed when in storage, for example, threads inside a clothing pocket.

A closed cylinder 230 is formed adjacent the shaft 29. A though hole 235 receives a delta ring 240, which is, in turn, connected to a swivel 245. An expandable finger ring 250 is connected to the free end of the swivel 245, thereby permitting free rotation of the rest of the device 1 about the finger ring 250.

Figure 21:
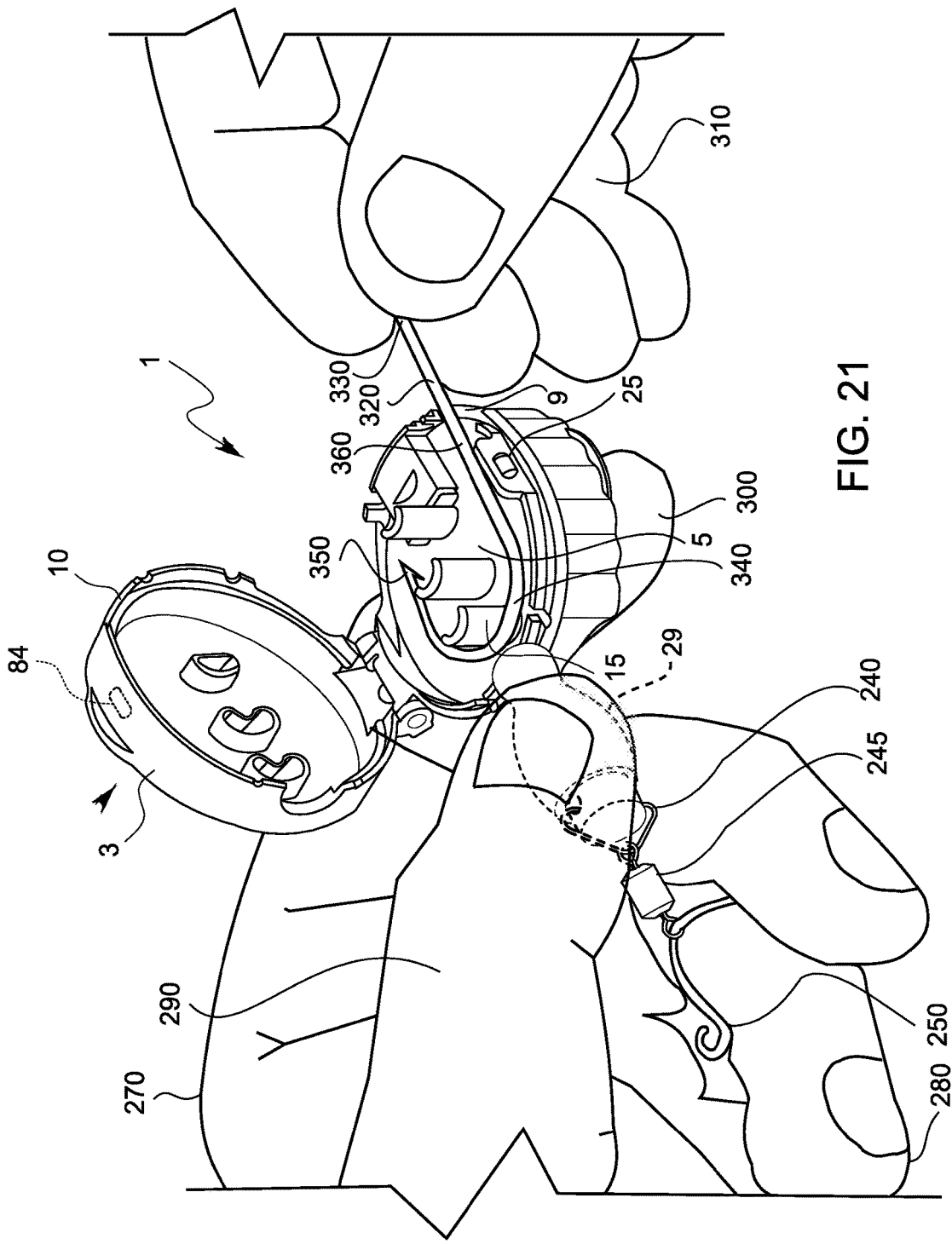
FIG. 21 is a top isometric projection of a device of the first embodiment shown in an open configuration being used by a user.

With reference to FIG. 21, the device of FIG. 20 is shown in use. Only reference numerals relevant to its depicted use are shown.

A user (only a portion shown) using a left hand 270 places a ring finger 280 through the finger ring 250. The device 1 is held by a thumb 290 and an index finger 300. The device 1 is in an open configuration.

The user uses a free hand 310 to grip a hook 320 at an eye end 330 thereof and place the hook 320 onto the base portion 5, such that a bend 340 abuts against the hook engaging member 15. A barbed point 350 of the hook 320 does not protrude from the device 1 and is located entirely on the base portion 5. A shank 360 of the hook 320 is laid across elongated notch 9.

The user moves the device to the closed configuration by rotating the closure portion 3 towards the base portion 5 until the tongue 25 engages with the cavity 84 to retain the device 1 in its closed configuration.

The hook 320 is arrested from moving within the device 1 by engagement with the elongated notch 9 and the complementary elongated notch 10 and the hook engaging member 15.

The user is able to rotate the device about the finger ring 250 by rolling the shaft 29 between the thumb 290 and the index finger 300. The delta ring 240 turns with the device but the device remains anchored through the swivel 245 by the finger ring 250.

The process for tying a fishing line onto the hook is the same as has been described with respect to FIG. 10, above, and will not be repeated here.

It will be appreciated by workers in the relevant field that modifications to the above examples can be made that will still fall within the scope of the present invention. In particular, a jig head could replace the hook described in the examples. Different fishing line types and sizes can be used with the device.

It will be appreciated that the invention broadly consists in the parts, elements and features described in this specification, which when compared to prior art relating to the field, should serve to illustrate the novelty of the invention described herein.

What I claim is:

1. A line tier for use with a tackle item, comprising:
   an enclosure comprising a tackle retention end and a second end opposed to the tackle retention end with a longitudinal axis defined between them, which tackle retention end comprises a central portion proximal the longitudinal axis and a peripheral portion lateral to the longitudinal axis;
   a rotatable member extending from the second end of the enclosure, the rotatable member permitting rotation of the enclosure about the rotatable member or a portion of the rotatable member;
   the enclosure comprising a base portion and a closure portion;
   the closure portion being moveable relative to the base portion between an open configuration and a closed configuration;
   wherein in the open configuration a tackle item can be inserted into the enclosure such that a portion of the tackle item protrudes from the enclosure;
   wherein in the closed configuration, the tackle item can be held in the enclosure and secured therein with a portion of the tackle item protruding from an elongated slot formed in the tackle retention end of the enclosure; and
   wherein a plurality of fishing lines can be held in the enclosure and secured therein with a portion of each fishing line protruding from the enclosure on the tackle retention end and the second end of the enclosure.

2. A line tier as claimed in claim 1, wherein the elongated slot is formed partly by the base portion and partly by a closure portion when the enclosure is in the closed configuration.

3. A line tier as claimed in claim 1, wherein the slot tapers from the peripheral portion towards the central portion of the tackle retention end such that larger hooks with a large shank thickness are able to be accommodated towards the peripheral portion thereof and smaller hooks with a smaller shank thickness are able to be accommodated towards the longitudinal axis side thereof.

4. A line tier as claimed in claim 1, wherein proximal but separated from the elongated slot is a tackle retention end aperture formed partly by the base portion and partly by a closure portion when the enclosure is in the closed configuration.

5. A line tier as claimed in claim 1, wherein inside the enclosure are a plurality of laterally extending hook-engaging members on the base portion.

6. A line tier as claimed in claim 1, wherein inside the enclosure are a plurality of laterally extending arcuate hook-engaging members on the base portion.

7. A line tier as claimed in claim 1, wherein inside the enclosure are a plurality of laterally extending hook-engaging members on the base portion and complementary laterally extending features on the closure portion that engage with the laterally extending hook-engaging members on the base portion when the enclosure is in the closed configuration.

8. A line tier as claimed in claim 1, wherein the enclosure further comprises a line cutter located within the enclosure and only accessible by the user in the open configuration so that it is not exposed when the enclosure is in the closed configuration.

9. A line tier as claimed in claim 1, wherein the enclosure further comprises a bottle opener.

10. A line tier as claimed in claim 1, wherein the enclosure is ovoid with the larger dimension in the longitudinal axis dimension.

11. A line tier as claimed in claim 1, wherein the rotatable member is connected to the enclosure by way of a bearing.

12. A line tier as claimed in claim 1, wherein the rotatable member is connected to the enclosure by a ball and socket bearing.

13. A line tier as claimed in claim 1, wherein the rotatable member is connected to the enclosure by a swivel.

14. A line tier as claimed in claim 1, wherein the rotatable member is connected to the enclosure by at least one elastomeric length of material.

15. A line tier as claimed in claim 1, wherein the rotatable member is a hook or a finger ring.

16. A line tier as claimed in claim 1, wherein a second end aperture is formed in the second end of the enclosure.

17. A method for tying a fishing line to a tackle item, comprising:
   providing a line tier according to claim 1;
   inserting in the open configuration of the closure portion a tackle item into the enclosure such that a portion of the tackle item protrudes from the enclosure;
   moving the closure portion to the closed configuration, wherein the tackle item is held in the enclosure and is secured therein so that the tackle item passes through the elongated slot formed in the tackle retention end of the enclosure;
   providing a fishing line that has a remote portion and a tackle engaging portion, the tackle engaging portion having an end; and
   engaging the tackle engaging portion of the fishing line with the tackle item by joining the tackle item with the portion of the tackle item that protrudes from the enclosure;
   joining the tackle engaging portion to the fishing line;
   retaining the end of the tackle engaging portion and the remote portion such that they are independent of any rotation of the enclosure;
   twisting the fishing line by rotating the enclosure;
   forming a loop in the twisted fishing line proximal the tackle item;

threading the end of the tackle engaging portion through the loop thereby forming a knot; and tightening the knot by applying tension between the fishing line and the tackle item.

18. A method for tying a fishing line to a tackle item defined in claim 17, wherein larger hooks with a large shank thickness are accommodated towards the peripheral portion of the tackle retention end and smaller hooks with a smaller shank thickness are accommodated towards the longitudinal axis side thereof.

19. A method for tying a fishing line to a tackle item defined in claim 17, wherein inside the enclosure are a plurality of laterally extending hook-engaging members on the base portion and complementary laterally extending features on the closure portion that engage with the laterally extending hook-engaging members on the base portion when the enclosure is moved to the closed configuration.

20. A method for tying a fishing line to a tackle item defined in claim 17, wherein the enclosure further comprises a line cutter located within the enclosure and only accessible by the user in the open configuration so that it is not exposed when the enclosure is in the closed configuration.

* * * * *